May 13, 1958  J. W. WAUGH  2,834,841
CURRENT COLLECTING DEVICE
Filed Nov. 6, 1953  3 Sheets-Sheet 1
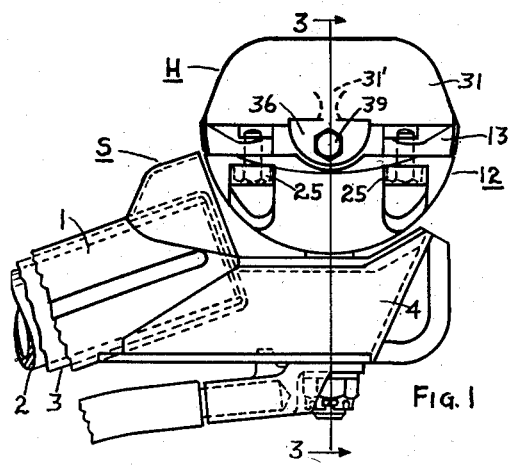
Fig. 1
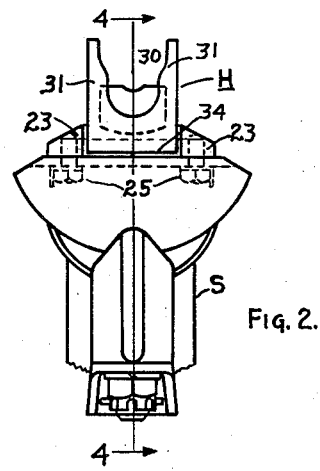
Fig. 2
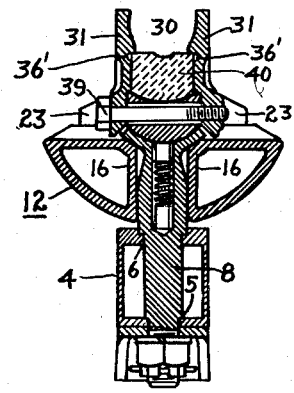
Fig. 3
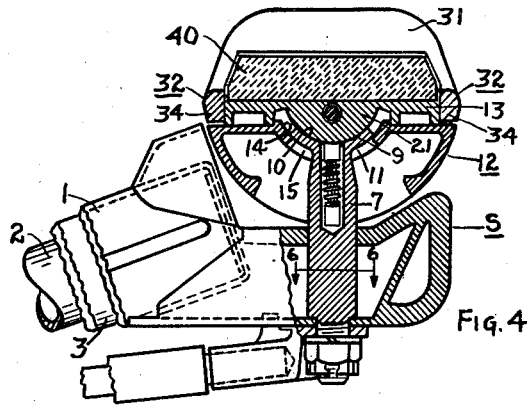
Fig. 4
Fig. 5
Fig. 6
INVENTOR.
John W. Waugh
BY
Attorney May 13, 1958 J. W. WAUGH 2,834,841
CURRENT COLLECTING DEVICE
Filed Nov. 6, 1953 3 Sheets-Sheet 2
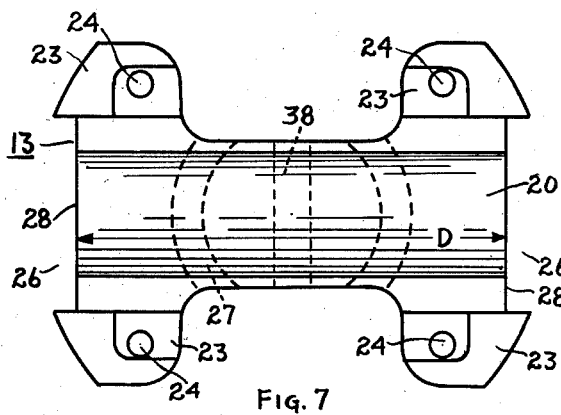
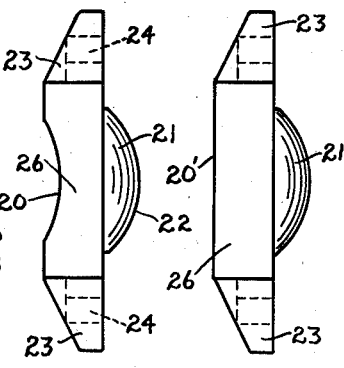
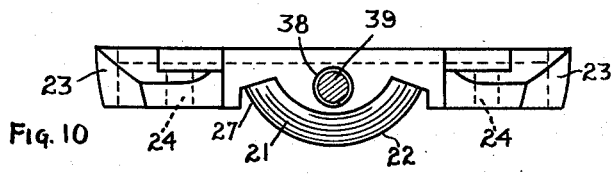
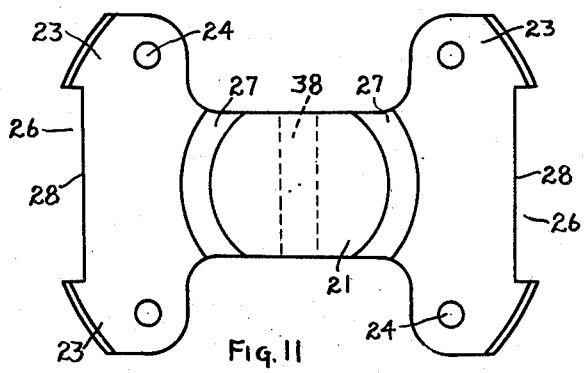
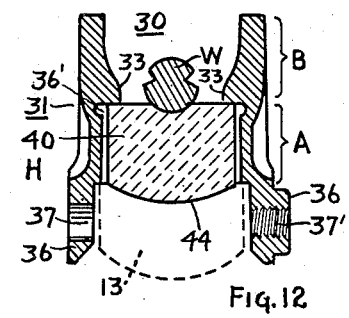
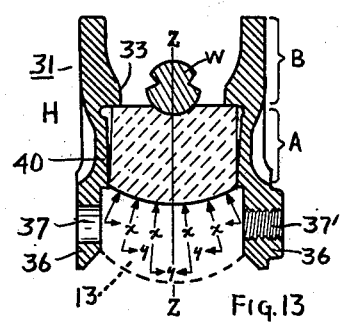
INVENTOR.
John W. Waugh
BY
Attorney May 13, 1958   J. W. WAUGH   2,834,841
CURRENT COLLECTING DEVICE
Filed Nov. 6, 1953   3 Sheets-Sheet 3
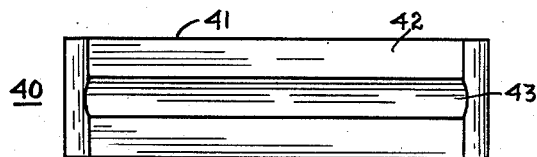
Fig. 14
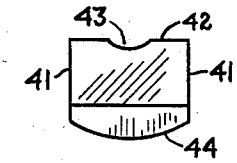
FIG. 15
FIG. 16
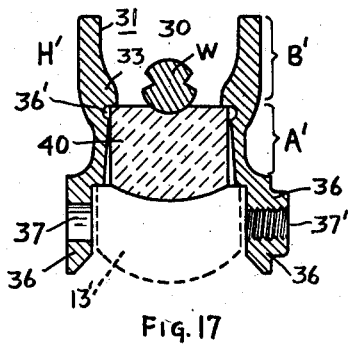
FIG. 17
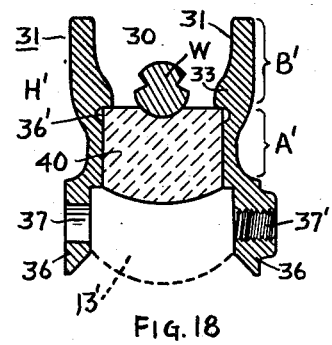
FIG. 18
INVENTOR.
John W. Waugh
BY
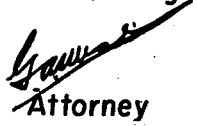
Attorney United States Patent Office 2,834,841
Patented May 13, 1958

2,834,841

CURRENT COLLECTING DEVICE

John W. Waugh, Bellville, Ohio, assignor to The Ohio Brass Company, Mansfield, Ohio, a corporation of New Jersey Application November 6, 1953, Serial No. 390,470

16 Claims. (Cl. 191—59.1)

This invention relates to current collectors of the type mounted on electrically operated vehicle, to contact the trolley wire as the vehicle moves along the right-of-way, and to receive current from the trolley wire which current is then conducted to the vehicle for use in operating the electrical equipment.

The complete device comprises a pole head secured as a rule in insulated relation to the outer end of a trolley pole, a support pin secured to the pole head, a saddle pivotally mounted on the support pin, an insert holder secured to the saddle and a renewable insert preferably of a carbonaceous material. The invention resides largely in the new and useful saddle, holder and insert and their constructive and functioning relation.

The collector is of the shoe or sliding contact type.

One object of this invention is to provide means on the holder to interengage with means on the saddle to prevent relative lateral and longitudinal movement of the holder and saddle.

Another object is to provide a construction in which the holder and insert are secured to the saddle by a single simple means whereby a worn insert may be replaced in the shortest time and simplest manner.

Another object is to provide a collector in which a single means secures the shoe (holder and insert) to its support (saddle) and simultaneously secures the holder to the insert.

Still another object of this invention is to provide the holder and saddle with means whereby all impacts upon the shoe from contact with overhead fittings will be transmitted directly to the saddle, and the single means securing the holder to the saddle will be free from the effects of such impact blows.

Another object is to provide cooperating means between the insert and the holder and saddle whereby breakage of the insert is lessened, hence the insert will have a longer wearing life than present day inserts.

Another object is to provide a collector in which a maximum clamping force upon the insert is along the lower longitudinal portion of the side surfaces of the insert and practically none along the upper longitudinal portion of the side faces of the insert which permits the upper portion to fall away when the upper portion is badly broken from impact with overhead leaving the lower portion fairly intact.

Other objects will be apparent as the construction and operation of this invention is further disclosed.

The invention resides in the new and useful construction combination and relation of the parts herein described and shown in the drawings accompanying this specification.

In the drawing:

Fig. 1 is a side view of the improved current collector.
Fig. 2 is an end view of Fig. 1.
Fig. 3 is a section of Fig. 1 on the line 3—3.
Fig. 4 is a view in partial section on a vertical plane of Fig. 2 through the line 4—4.
Fig. 5 is a substantially full size bottom view of the holder shown in Figs. 1–4.
Fig. 6 is a section on line 6—6 of Fig. 4.
Fig. 7 is a substantially full size top plan view of the saddle in Figs. 1 to 4 inclusive.
Fig. 8 is an end view of Fig. 7.
Fig. 9 is an end view of the saddle of modified design.
Fig. 10 is a side view of Fig. 7.
Fig. 11 is a bottom plan view of Fig. 7.
Fig. 12 is a substantially full size sectional view of the holder and insert shown in Fig. 3 on the line 3—3 of Fig. 1 before the holder is secured to the insert and saddle.
Fig. 13 is a sectional view corresponding to that shown in Fig. 12 after being secured to the holder and insert.
Fig. 14 is a top plan view of one form of an insert.
Fig. 15 is an end view of one form of an insert.
Fig. 16 is an end view of another form of insert.
Fig. 17 is an enlarged view of a portion of another form of this invention, in section, on the line 3—3 of Fig. 1 with the parts in unclamped relation.
Fig. 18 is a sectional view corresponding to that shown in Fig. 17, substantially full size, after the parts are secured together.

In a complete embodiment of the current collector herein disclosed in Figs. 1 to 4 inclusive, the device comprises a support head S formed preferably of a number of parts of sheet steel and the parts welded together to form a unit; the support head may be made of malleabilized cast iron or bronze.

The head is provided with a tubular portion 1 which receives the end of a trolley pole 2 with an interposed elastic sleeve 3 preferably of deformable rubber secured to the pole 2. The member 3 acts not only as an electrical insulator but as an insulator of vibration and sound.

The support head is also provided with a hollow shelf portion 4 with vertically registering openings 5 and 6 to receive support stud 7. The portion 8 of the stud is other than round as shown in Fig. 6 and the opening 6 corresponds in shape thereto whereby rotation of the stud relative to the support head is prevented.

At the upper end of the stud 7 is an enlarged supporting flange 9, the upper surface 10 is concave and the lower surface 11 convex and parallel to the concave surface 10.

Associated with the concave surface 10 of the supporting flange is a swivel head 12 formed of sheet metal or of cast metal preferably ferrous and a saddle member or body 13. The swivel head 12 is semi-bowl shaped and having a concave bearing surface 14 corresponding to and engaging the bearing surface 11, and is free to rotate about the vertical axis of the stud to permit the shoe to follow the trolley wire when the vehicle on which it is mounted is traveling out of alignment with the trolley wire.

The swivel head is provided with a slot-like opening 15 through which the stud projects and which permits the head and saddle to pivot in a vertical plane (Fig. 4) but the head is provided with parallel spaced walls 16 which engage the stud and allow the swivel head to pivot only in a single vertical plane (Fig. 3).

No claim is made as to novelty with respect to the support head S, the stud 7 and the swivel head 12, as these parts are substantially disclosed in U. S. Patent 2,044,886, of June 23, 1936, and are usable with either form of super structure herein disclosed.

The saddle 13 which cooperates with the swivel head 12 is shown substantially full size in Figs. 7 to 11 inclusive. The saddle is provided with a central body portion and has a central longitudinal groove 20 along its upper longitudinal face with a concave bearing surface.

On the opposite face of the saddle, and central thereof is a projecting support 21 with a spherical bearing surface 22 the curvature of which corresponds to that of the concave bearing surface 10 of the flange 9 upon which the saddle 13 rests.

Projecting laterally and longitudinally from each side of the saddle 13 and at each end, are lugs 23, provided with threaded openings 24 to receive fasteners 25 which may be machine screws or bolts and which pass through openings in the upper surface of the swivel head 12 in registration with the openings 24. The members 25 secure the swivel head and the saddle together so that they rotate and pivot as a unit on the flanged end of stud 7. The saddle ends are formed with recesses 26 to receive lugs on the holder as later described, and the body is provided with circular grooves 27 which permit the necessary pivotal movement of the saddle in a vertical plane (Figs. 4 and 10).

The holder H for the insert is mounted on the saddle 13 and so interengaged therewith that there is no lateral, vertical or longitudinal movement of one part relative to the other when assembled.

The holder H (Figs. 5, 12 and 13) consists of a body preferably of bronze metal, with an elastic or resilient property and having a longitudinal open top and open botom receptacle 30 formed by two laterally spaced upstanding longitudinal walls 31 held in fixed relation by end walls 32 which are much lower than the side walls 31.

The space between the walls 31 is divided into two portions, namely, the portion A in which is positioned an insert and the portion B above the portion A to receive the trolley wire W in contact with the insert (Fig. 12) and guide the collector along the trolley wire. The walls 31 are provided with longitudinal ribs 33 which prevent the upward movement of the insert when the collector is assembled and in use.

The end walls 32 of the holder are also provided with sturdy lugs 34, Fig. 4, which project downwardly below the longitudinal edges of the side walls 31; the lugs 34 are of such width as to just slip into the recesses 26 of the saddle (Fig. 11) while the longitudinal space C (Fig. 5) between the inner faces 35 of the lugs 34 is such as to just receive the longitudinal portion D of the saddle which extends between the faces 28 (Fig. 7). This construction is important and prevents any relative lateral and longitudinal movement between the holder and saddle, an important feature, since any impact force upon the holder is thereby directly applied to the saddle as is later explained.

The holder H is provided with a pair of oppositely disposed lugs 36 which depend from the longitudinal central and lower edge of the walls 31 for securing the holder to the saddle and for drawing the lower portion of the walls into engagement with the side faces of the insert.

The side walls of the portion A of the receptacle are constructed reasonably thin as compared with those of the portion B (Fig. 12); the two portions being integrally united and the holder H being preferably of a resilient or elastic bronze, the lower part of the side walls of portion A will yield inwardly quite readily as compared with their upper part when force is applied to the lugs 36. This yielding or bending along the line of union between the portions A and B is aided by the longitudinal grooves 36' (Figs. 3 and 12) and somewhat by the end grooves 36" (Fig. 5) intersecting the grooves 36'.

The lugs 36 are provided with register openings 37, one of which 37' is threaded (Fig. 12) and the saddle is provided with a through opening 38 which is axially aligned with the openings 37. A securing means, such as a bolt 39, extends through the openings for drawing the holder into intimate relation, first with the insert and then with the saddle.

The openings 37 and 37' for the fastener 39 are of such size as to just admit the fastener, but the opening 38 through the saddle is sufficiently large (Fig. 10) to insure that any slight inadvertent relative movement between the saddle and holder due to severe impact upon the holder and insert will not be taken up by the fastener (Fig. 3); this is important as it prevents the securing means being deformed or unduly held against easy removal and replacement through binding and undue friction with the saddle.

Another important feature of this invention is the means whereby and the manner in which the holder engages with the insert of which two disclosures are now made.

In one form of holder the walls 31 of the portion A are not only relatively thin but are slightly concaved (Fig. 5) throughout their vertical height and length, that is, the space E is less than the space F by a reasonable amount while the adjacent side faces of the insert 40 are flat and parallel and the width substantialy that of space E, such that there is preferably a sliding fit between the ends of the insert and the adjacent side faces of the holder whereby the insert will normaly (before assembly) be held by friction in the holder before and during the assembly of the holder and insert with the saddle. The space between the walls and the insert intermediate the ends of the insert is that resulting from the normal curvature of the adjacent wall face (Fig. 12).

As the securing bolt 39 is tightened the walls of the lower part of the portion A are drawn inwardly toward the insert but not uniformly. The walls start to contact and press against the adjacent faces of the insert from the ends as the securing means is tightened, then as the securing means 39 is further tightened the contact and pressure continues to increase toward the longitudinal center of the walls due to the laterally inward movement of the walls, but due to the upper portion of the walls of portion A being integral with the rigid walls of the portion B and the pressure of the securing means being applied mainly along the lower portion of the walls of portion A the final result is for the curvature of the lower portion of the walls to straighten out and the walls to engage and press against the insert along the entire length of the lower portion of the insert while the upper portion of the walls of portion A may remain more or less curved or in light contact with the upper side portion of the insert faces.

This result is illustrated in Figs. 12 and 13 in which the relative condition of the parts before the application of the inward force, is shown in Fig. 12 in which the normal space between the walls and insert is the amount of curvature of the wall faces; in Fig. 13 is shown the result of tightening the securing means 39 wherein the lower portion of the walls press against the insert while the upper portion of the walls is still somewhat free of contacting the insert. This relation between the walls and insert as shown in Fig. 13 may vary due to varying conditions such as the amount of curvature of the wall faces and stiffness of the metal in the walls in particular and in some cases the upper portion of the walls of portion A may lightly contact the insert but it is strongly desired for the walls to firmly press against the lower longitudinal portion of the insert side faces.

The relation of the parts to one another is such that when the lugs 36 are drawn fully inward they will press tightly against the saddle, which is necessary to secure the holder and insert in place, in which case the holder walls will press firmly and securely against the entire length of the lower portion of the insert while the pressure, if any, will be much reduced along the upper portion of the insert. Under any event the maximum pressure against the insert will be along the lower portion thereof.

This construction has been found advantageous in effecting an increase in the life of the insert as against clamping tightly the entire side faces of the insert. A reverse rotation of the securing means 39 permits the removal of the holder and insert as for replacement purposes, since the walls of the holder are elastic and resilient whereby the lugs 36 and lower walls will return to their normal condition when the inward holding pressure is removed.

The insert 40 consists preferably of a frangible electrically conductive body, such as a carbonaceous material, either plain or impregnated preferably with a metal while in the molten state, thus sealing the pores and increasing the life of the insert. The combined insert and holder are usually referred to as the shoe.

The insert (Figs. 14 and 15) is a longitudinal body having flat parallel side faces 41 and a top face 42 squared with the side faces 41 and having a longitudinal groove 43 to initially receive the trolley wire W. The lower bearing face 44 of the insert body is convexed and conforms to the curvature of the bearing surface 20 of the saddle and is longitudinally parallel to the upper or top face 42. The end faces may be sloped as disclosed in Fig. 4 The length of the saddle upon which the insert rests supports the insert for its full length which aids in reducing breakage of the insert.

The curved lower surface 44 of the insert has a decided advantage in that it tends to aid in preventing the insert splitting along longitudinal lines. Referring to Fig. 13, the vector forces $x$, as applied during normal service, between the insert and the saddle, act against the curved surface 44 of the insert. These vector forces $x$ have vector component forces $y$ which act horizontally toward the center line $z$ of the insert, tending to prevent the insert from splitting apart longitudinally. If the insert should become longitudinally cracked, the horizontal vector forces $y$ will tend to close the crack. Also the curved surface 44 has a somewhat greater bearing area than a flat surface as shown in Fig. 16.

Fig. 16 shows an end view of a modified insert in which the lower face 44' is flat and parallel to the upper face in place of convexed as in Fig. 15. If desired, the side faces 41 may be convexed as disclosed in U. S. Patent 2,185,270 of January 2, 1940, providing the inner faces of the walls of portion A are convexed slightly more than the walls of the insert.

In Fig. 9 is disclosed an end view of a modified saddle in which the upper surface 20' is flat in place of concaved as in Fig. 7, and is used when the insert is provided with a flat lower surface as in Fig. 16.

When it is desired to renew an insert, it is only necessary to remove the single bolt or equivalent securing means which permits removing the holder and the worn insert from the saddle, then replacing the holder and new insert on the saddle and replacing the securing means 39, a simple and quick operation.

A second construction of the holder which has advantages over the above described form consists in a modification of the inner faces or surfaces of the walls of portion A. In the modification H' in place of the inner face of the walls being fully concave as previously described and shown in Fig. 5, the inner face of each wall of portion A' (Fig. 17) is straight along its upper longitudinal portion in place of curved and the opposite or lower longitudinal part of the walls of the portion A' is concaved, and the two portions are blended, the one into the other, whereby the width of the upper part of the portion A' of the receptacle is uniform throughout its length and the width of the lower part of the portion A' of the receptacle varies as in the case of Fig. 5.

A section of the second described holder H' before applying an inwardly acting force to the lugs 36 is shown in Fig. 17 which corresponds to Fig. 12 in which latter case the entire inner faces of the lower walls are concaved. Here the upper part of each wall of the portion A' is shown as normally contacting the upper portion of the insert which is true throughout the length of the insert. The width of the receptacle at the upper part of the portion A' is such that there is a sliding fit between the holder and insert at this point which, through slight friction, holds the insert and holder assembled while assembling with the saddle.

The lower part of each wall of portion A' is shown as normally spaced from the insert in Fig. 17 as in the case of Fig. 12, since that portion of the walls is concaved. Therefore when an inward force is applied to the lugs 36 the lower portion of the walls is moved inwardly as in the case of the walls of Fig. 12, but the upper portion of the lower walls is changed very slightly as there is an integral union with the rigid walls of portion A' and the force is applied to the lower portion of the walls of portion B'.

Under the inward force against the lugs 36 (Fig. 17), the walls are moved inwardly along their lower part, thus bringing their lower part into engagement with the lower portion of the side faces of the insert and by the time the lugs 36 engage the saddle 13' (Fig. 18), the walls will have securely clamped the insert throughout its length. The maximum pressure between the insert and adjacent walls will be along the lower part of the insert and this pressure will gradually decrease toward the upper longitudinal edges of the insert.

In either arrangement H or H', the integral connection between the rigid and movable portions of the side walls and the application of the calmping force to the lower part of the side walls of the portions A and A', the maximum clamping pressure of the holder upon the insert is along the lower longitudinal portion of the insert with a comparative smaller pressure, or practically none, applied along the upper portion of the side faces of the insert, while in use. This permits the upper portion of the insert to break away from the holder should the insert become broken from wear and impact with the overhead construction.

The vector forces described in case of Fig. 13 will also apply to the insert of Fig. 18.

It should be understood the invention is subject to various changes and modifications which will fall within the scope of the appended claims without departing from the spirit and scope of the invention.

Having described my invention, what I claim is:

1. A sliding current collector comprising, a swivel head and a saddle detachably secured together and each having spherical and parallel bearing surfaces, a support provided with spherical bearing surfaces cooperating with the first said bearing surfaces whereby the swivel head and saddle may rotate about a substantially vertical axis and pivot in a vertical plane, the saddle having a central longitudinal portion and a longitudinal bearing surface of substantially the full width and length of the central longitudinal portion, a plurality of lugs, one projecting both laterally and lognitudinally from each corner of the said central portion thereby forming a recess at each end of the saddle, an opening extending transversely through the said central portion, a holder mounted on the saddle, the holder provided with a pair of spaced upright walls with end walls thereby forming an elongated receptacle positioned above the said longitudinal bearing surface and of substantially the width thereof, a downwardly projecting lug at each end of the holder inter-engaging with the recesses at the ends of the saddle to prevent longitudinal and lateral relative movement of the holder and the saddle, the receptacle having an upper portion to receive a trolley wire and a lower portion, an insert of frangible electrical conducting material with plane parallel side surfaces mounted in the lower portion of the receptacle and resting upon the said longitudinal bearing surface of the saddle, the portion of the side walls adjacent the insert being inwardly yieldable and the inner surfaces thereof being concave relative to the adjacent side surface of the insert, a lug depending from the lower longitudinal center of each wall normally in spaced relation to the adjacent side face of the saddle, an opening in each lug registering with the opening through the saddle, and securing means extending through the openings to first draw the said inner concaved surfaces of the walls into contact with the insert and then draw the last said lug into engagement with the saddle.

2. In a current collecting device of the slider type, in combination, a support head provided with means to receive the end of a trolley pole and having a substantially vertically disposed support with spherical bearing surfaces, a saddle with a spherical bearing surface to cooperate with one of the bearing surfaces on the vertical support, a swivel head having a spherical bearing surface to cooperate with the other bearing surface on the vertical support, the saddle and the swivel head secured together to rotate about the axis of the vertical support and pivot in a vertical plane through the vertical support axis, the saddle provided with a longitudinal central portion with a longitudinal, transverse concaved, bearing surface, a plurality of lugs projecting from the said central portion cooperating with means to secure the swivel head and saddle together, the lugs forming recess means, a transverse opening extending through the said central portion, a holder mounted on the said central portion and having a pair of spaced upright side walls and a pair of end walls forming an elongated receptacle positioned above the said longitudinal concaved bearing surface which in turn forms the bottom surface of the receptacle, the holder having downwardly projecting means cooperating with the recess means to prevent relative side and longitudinal movement of the saddle and holder, an elongated insert of frangible electrical conducting material mounted in the lower portion of the receptacle, the insert having flat parallel side surfaces and a convex bottom bearing surface resting upon the longitudinal bearing surface of the saddle, a portion of each upright wall having a concaved surface relative to the adjacent side surface of the insert, depending means from each upright wall intermediate the ends thereof, an opening through each depending means aligned with the opening through the saddle, and securing means extending through the several openings to draw the said concaved portion of each wall inwardly until the lower part of said concaved surface flattens and engages the adjacent portion of the insert face and the depending means engage the saddle, thereby securing the saddle and holder and insert in assembled relation.

3. In a current collector, in combination, an elongated body adapted to be mounted upon a supporting member of a trolley head, an insert holder of metal mounted on the said body having a recess for holding an insert along the bottom part thereof, an elongated insert of frangible electric conducting material in the said recess, the insert positioned in the lower portion of the recess, the said body having a top bearing surface and the insert having a lower bearing surface conforming to and cooperating with that of the said body, means on the holder cooperating with means on the said body to check relative lateral and longitudinal movements between the holder and the body, the holder provided with a pair of elongated side walls and a pair of end walls forming the said recess, the lower portion of the side walls forming the said lower portion of said recess being relatively thin compared with the upper portion of the side walls, the lower part of said lower portion of each of said side walls being yieldable and each lower part having an elongated inner concave surface, the normal width of the ends of the lower portion of the recess being that of the insert and the normal width of the recess at an intermediate point between its ends being greater than that of the width of the insert at the same intermediate point, the holder provided with means depending from the lower portion of each side wall and normally spaced from the body, registering openings through the depending means and the body and securing means passing through the openings and arranged when rotated in one direction to draw the lugs inwardly whereby the said lower part of the lower portion of the side walls will be forced inwardly and the faces thereof into engagement with the lower part of the side walls on the insert and simultaneously force the lugs forced inwardly and into contact with the body.

4. In a current collector, in combination, an elongated saddle adapted to be clamped against a supporting member on one face thereof, an insert holder mounted on the opposite face of the saddle, the holder provided with a pair of elongated spaced upstanding walls forming the sides of a receptacle, end members holding the side walls in spaced relation, means on the holder engaging with means on the saddle to prevent longitudinal and lateral relative movement of the holder and saddle, the said opposite face of the saddle forming the bottom face of the receptacle and support for an insert, means depending from the lower portion of each side wall in spaced relation to the saddle, and the adjacent portions of the side walls being of relatively thin construction, the depending means and the adjacent part of the side walls being bendable inwardly upon the application thereto of inwardly directed force, the inner faces of the said adjacent part of the side walls being longitudinally concave whereby the receptacle will normally be wider intermediate its ends than at its ends, the inner faces of the upper part of the lower portion of the side walls being longitudinally straight, manually operable securing means associated with the depending means whereby force may be applied to the said depending means and the depending means and adjacent part of the side walls moved inwardly when the securing means is rotated in one direction whereby the curvature of the lower part of the lower portion of the side walls is eliminated and the faces thereof adapted to press firmly against the lower adjacent portion of an insert positioned in the receptacle and further application of said inward forces eliminating the said space between the depending means and the saddle, the said straight part of the lower portion of the side walls being unaffected by the said forces.

5. A current collector shoe and support comprising, an elongated body having an elongated bearing surface adapted to support an insert, longitudinally and laterally projecting lugs on each side of the body at each end thereof, a transverse opening through the body intermediate the ends thereof and below the bearing surface, a holder mounted on the body having a pair of spaced upstanding side walls forming the sides of an open bottom elongated receptacle, the said elongated bearing surface on the body forming the bottom surface of the receptacle when the parts are assembled, transverse end walls integral with the side walls to maintain the side walls in spaced relation, means on the holder projecting downwardly along the ends of the body and received between the lugs of the body to prevent lateral and longitudinal movement of the holder relative to the body, downwardly projecting means from the lower edge of each side wall intermediate the ends thereof, openings through the downwardly projecting means registering with the transverse opening through the body, an elongated insert positioned in the lower portion of the receptacle and having a bottom bearing surface associated with and conforming to the bearing surface on the body, and securing means extending through the said registering openings to draw the side walls opposite the insert inwardly and the inner surfaces thereof into firm engagement with the adjacent side faces of the insert whereby the maximum clamping force of the holder against the insert will be along the lower longitudinal portion of the sides of the insert.

6. A current collector shoe and support as set forth in claim 5, in which the cross-sectional shape of the bottom surface of the insert and of the longitudinal bearing surface of the body are convex cross section centered about the longitudinal axis of the insert and such that the forces exerted upon the bearing surface of the insert during normal operation are directed toward the longitudinal axis of the insert and tend to limit longitudinal breakage of the insert and to retain closed any longitudinal defects which may develop in the insert.

7. A shoe and support as set forth in claim 5, characterized by the portion of the side walls opposite the insert being thinner than the portion of the side walls above the insert and the upper part of the inner face of the portion of each side wall opposite the insert being longitudinally straight and normally having a sliding contact with the adjacent side face of the insert, and the lower part of the inner face of the portion of each side wall opposite the insert being longitudinally concave and spaced from the adjacent side face of the insert, whereby the lower part of the portion of the side walls opposite the insert may be drawn inward to contact the lower adjacent side portion of the insert.

8. A current collector comprising a holder in the form of an elongated metallic member having two spaced side walls rigidly held at the ends thereof by two end walls, a shoulder along the inside of the upper part of each of the side walls extending along the length of the side walls and uniting with the end walls to form a rigid receptacle for holding an insert, relatively flexible lower side walls, two laterally opposed lugs projecting downward from the side walls along the central part thereof, and two longitudinally opposed lugs projecting downwardly from the end walls, a saddle comprising an elongated member recived between the laterally opposed lugs and between the longitudinally opposed lugs and abutting the lower portions of the side walls, the elongated member having a concave groove extending longitudinally along the upper part thereof, two laterally spaced longitudinally projecting portions at each end of the saddle for holding the longitudinally opposed lugs of the holder, and laterally extending projecting protions for securing the saddle to a trolley head, and means for drawing the laterally opposed lugs toward the saddle to compress the lower portions of the side walls of the holder against an insert in the holder and secure the holder to the saddle.

9. The invention in accordance with claim 8 and including a groove along the inside of each wall of the holder immediately below the shoulder to permit the upper portion of an insert to break away when the insert becomes worn.

10. The invention in accordance with claim 9 in which the inner faces of the lower portions of the walls are tapered outwardly from the portion of the wall adjacent the groove downwardly to the lower abutting portion before the side walls are compressed, whereby drawing the side walls together brings the inner faces thereof into substantially parallel relation to grip an insert uniformly along the sides thereof.

11. The invention in accordance with claim 8, the said concave groove in the saddle being defined by a surface having an arcuate cross section on each side of a central plane longitudinally through the saddle, each arcuate portion being directed toward the central plane.

12. A holder for receiving an insert in a current collector, comprising an elongated metallic member having two spaced side walls integrally united at the ends thereof with two end walls and having the end walls projecting downwardly below the side walls to constitute a longitudinal positioning means for the holder, a shoulder along the inside of the upper part of each of the side walls above the upper extremity of the end walls and united with the side walls to form a rigid receptacle having an open interior for receiving an insert upwardly through the bottom of the holder and engaging the shoulders, each of the side walls along the lower part thereof below the shoulders being yieldable inward to grip the sides of the insert and two laterally opposed lugs integrally formed at the side walls and projecting downwardly below the lower side walls for drawing the walls together.

13. The inveniton in accordance with claim 12 in which the inside surfaces of the lower side walls are normally parallel and taper inward at the lower part thereof along at least the longitudinally central part of the member when the lugs are compressed together.

14. The invention in accordance with claim 12 in which the inside surfaces of the lower side walls taper outwardly toward the lower part thereof along at least the longitudinally central part of the member and are disposed in substantially parallel relation when the lugs are drawn together.

15. The invention in accordance with claim 12 and including a groove along the inside of each wall of the holder immediately below the shoulder and with the lower side walls having a lesser cross section than the upper side walls along at least the longitudinally central part thereof facilitating flexure of the lower extremities of the side walls relative to the remainder of the member.

16. A holder for a current collector insert as set forth in claim 12, characterized by the width of the insert portion of the receptacle being increased along the lower longitudinal portions of the side walls along the central part thereof and the width remaining substantially constant along the line of union between the upper and lower portions of the side walls under an inward force applied to the walls.

References Cited in the file of this patent

UNITED STATES PATENTS

| | | |
|---|---|---|
| 2,020,909 | Schaake | Nov. 12, 1935 |
| 2,044,886 | Larsson | June 23, 1936 |
| 2,185,257 | Larsson | Jan. 2, 1940 |
| 2,709,724 | Mageoch | May 31, 1955 |
| 2,763,736 | Palmer | Sept. 18, 1956 |

FOREIGN PATENTS

| | | |
|---|---|---|
| 896,525 | France | May 2, 1944 |